Figure 1:
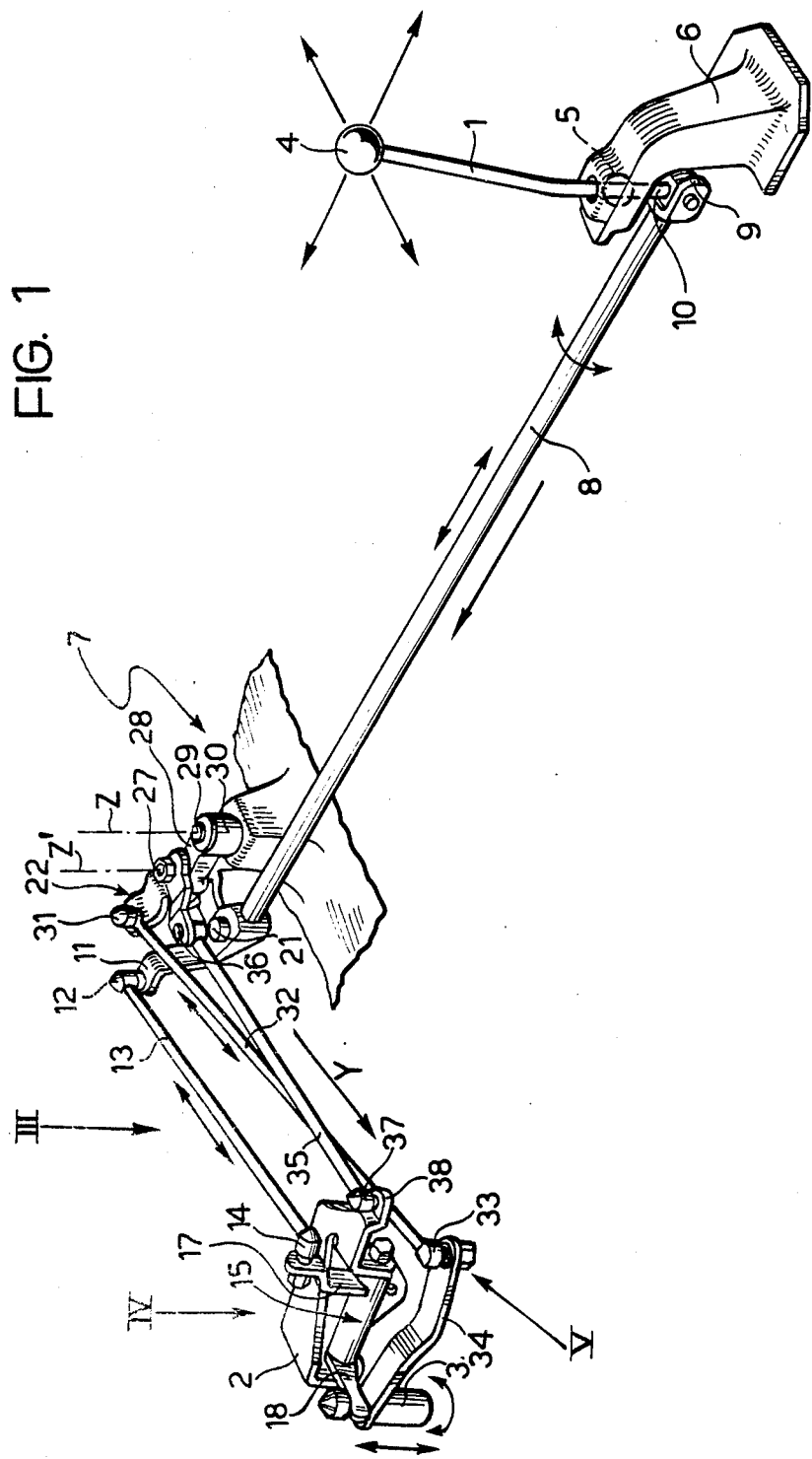

United States Patent [19]

Egidi et al.

[11] Patent Number: 4,799,397
[45] Date of Patent: Jan. 24, 1989

[54] CONTROL DEVICE FOR A MOTOR VEHICLE GEARBOX

[75] Inventors: Corrado Egidi; Riccardo Mongiano, both of Turin, Italy

[73] Assignee: Fiat Auto S.p.A., Turin, Italy

[21] Appl. No.: 129,116

[22] Filed: Dec. 4, 1987

[30] Foreign Application Priority Data

Dec. 4, 1986 [IT] Italy .................. 67904 A/86

[51] Int. Cl.[4] .............................................. G05G 9/16
[52] U.S. Cl. ................................................. 74/473 R
[58] Field of Search .......... 74/473 R, 473 P, 473 SW, 74/475

[56] References Cited

U.S. PATENT DOCUMENTS

| 3,805,635 | 4/1974 | Grosseau | 74/473 P |
| 4,509,384 | 4/1985 | Lamy et al. | 74/473 P |
| 4,524,635 | 6/1985 | Hulin et al. | 74/473 R |
| 4,653,341 | 3/1987 | Ferrario | 74/473 R |

FOREIGN PATENT DOCUMENTS

| 84472 | 7/1983 | European Pat. Off. | 74/473 R |
| 3201972 | 8/1983 | Fed. Rep. of Germany | 74/473 R |

*Primary Examiner*—Lawrence Staab
*Attorney, Agent, or Firm*—Sughrue, Mion, Zinn, Macpeak & Seas

[57] ABSTRACT

A control device for a motor vehicle gearbox in which a gear lever movable with a selection movement and a gear engagement movement drives an actuator member, located at the input to the gearbox, through a transmission including a longitudinal bar and a pair of transverse rods acutated by the longitudinal bar through a drive member pivotable about a first vertical axis which is rotatable about a second vertical axis fixed relation to the structure of the vehicle. A reaction tie rod connects the pivotable drive member to the structure of the gearbox substantially in the direction of the two rods.

5 Claims, 4 Drawing Sheets

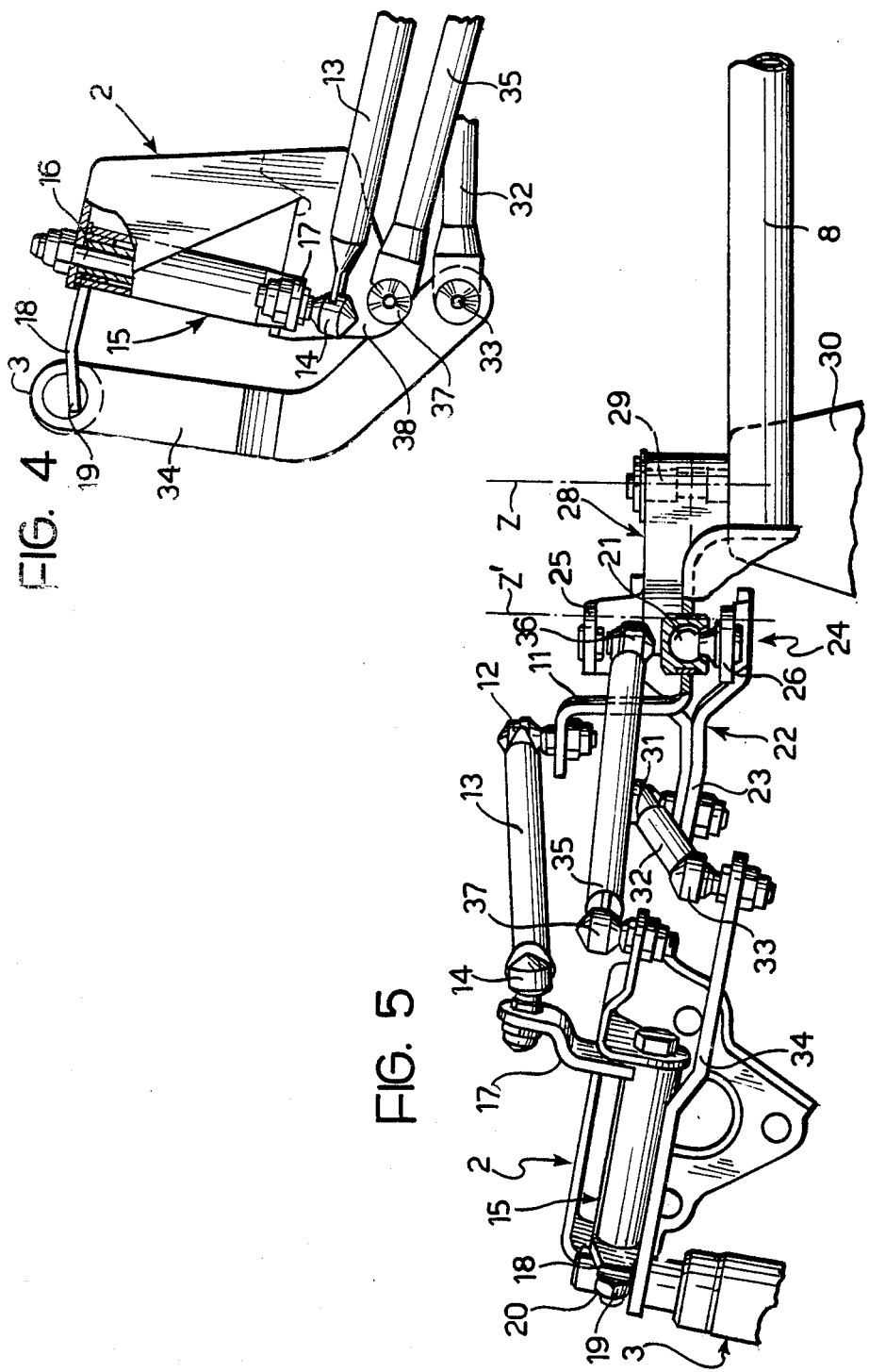

CONTROL DEVICE FOR A MOTOR VEHICLE GEARBOX

The present invention relates generally to control devices for motor vehicle gearboxes.

More particularly, the invention concerns a control device of the type comprising a manual gear lever supported by the structure of the vehicle in a position remote from the gearbox and movable with a selection movement and a movement for engaging the speed ratios of the gearbox, an actuator member which is located at the input of the gearbox and is translatable and rotatable in response to the selection and engagement movement of the gear lever, and a transmission interconnecting the gear lever and the actuator member of the gearbox.

In known control devices of the type defined above, the transmission between the gear lever and the gearbox actuating member is generally constituted by a series of articulated driving members and rods with which there are usually associated damping devices constituted by resilient members having the function of uncoupling the gear lever from the vibrational effects of the gearbox, which is formed by a unit integrated with the engine of the vehicle. Recourse to such damping devices is made necessary by the fact that the engine is supported resiliently by the structure of the vehicle and it is therefore necessary to prevent its operating vibrations from acting on the gear lever through the transmission of the control device, with obvious annoyance for the driver.

However, the presence of such dampers together with the resilient mounting of the gearbox leads to a lack of precision in the operation of the gearbox, in that the travel of the lever in its selection and engagement movements is inevitably influenced by the resilient yielding in the kinematic chain to the gearbox.

A further disadvantage of known control devices lies in the fact that their transmissions cannot absorb any errors in the positioning of the engine with the gearbox during assembly in the vehicle, whereby it is necessary to provide stations for the checking and possible adjustment of the components of the transmission between the gear lever and the actuating member of the gearbox in the vehicle assembly line.

The object of the present invention is to avoid these disadvantages and to provide a control device for gearboxes which can effectively isolate the gear lever from the vibrations caused by the vehicle engine, while ensuring, on the one hand, a control which is "positive", that is, free from resilient play and hence absolutely precise, and avoiding, on the other hand, the need for adjustment operations during assembly notwithstanding the resilient mounting of the engine.

According to the invention, this object is achieved by virtue of the fact that the transmission between the gear lever and the actuating member of the gearbox includes a bar articulated to the gear lever and extending substantially along the longitudinal axis of the vehicle, a drive member pivotable about a first substantially vertical axis which is rotatable about a second substantially vertical axis fixed relative to the structure of the vehicle, first and second rods extending substantially transverse the longitudinally axis of the vehicle and operated by the bar through the drive member respectively to effect the translation and the rotation of the actuator member of the gearbox, and a reaction tie rod connecting the pivotable drive member to the structure of the gearbox substantially in the direction of the two rods.

The main effect of this solution is that the discharge to the gearbox structure of external forces applied to the gear lever during the movements of selection and engagement of the speed ratios is avoided. In fact, all the selection and engagement forces are contained within the transmission of the control device by virtue of the freedom of movement of the drive member which is pivotable about the second vertical axis, and the presence of the reaction tie rod which ensures the balancing of the external forces within the transmission mechanism.

The configuration of the transmission also enables the effective uncoupling of gear lever from the vibrational movements and resilient movements of the engine with which the gearbox is associated, avoiding recourse to resilient damping members, as well as the avoidance of recourse to systems for the adjustment of the transmission components, since the same fredom of movement of the drive member enables any errors in assembly of the engine to be absorbed.

Finally, the control device of the invention enables more precise operation of the gearbox to be obtained in that, being free from resilient play and yielding, the selection and engagement movements of the actuator member are effected with corresponding travels of a fixed and practically constant magnitude of the gear lever.

The arrangement of the transmission in the control device of the invention is such that, in practice, the two rods define, together with the drive lever on the one hand and the control members of the actuator member of the gearbox on the other hand, substantially an articulated parallelogram configuration oriented transverse the longitudinal axis of the vehicle.

With such a configuration, any movement of the engine along the three axes (longitudinal, transverse and vertical) of the vehicle results in practically no corresponding movement of the gear lever in any condition.

In effect, the articulated parallelogram configuration is obtained by virtue of the fact that:

the longitudinal bar is articulated to the gear lever at one end and carries a first ball joint at its opposite end, the drive member is constituted by a double-armed lever of which the first arm extends generally parallel to the longitudinal axis of the vehicle and carries a second ball joint, and the second arm extends substantially perpendicular to the first arm and carries a third ball joint to which the bar is articulated close to the first ball joint, and by a connecting rod extending generally parallel to the longitudinal axis of the vehicle and having one end articulated to the structure of the vehicle about the fixed vertical axis and its opposite end carrying the rotatable vertical axis about which the drive lever is articulated between the second and third ball joints, a first drive member is supported rotatably by the gearbox structure to effect the translation of the actuator member and carries a fourth ball joint, a second drive member is fixed to the actuator member to effect its rotation and carries a fifth ball joint, the first rod has one end articulated to the first ball joint carried by the longitudinal bar and its opposite end articulated to the fourth ball joint carried by the first drive member, the second rod has one end articulated to the second ball joint carried by the first arm of the drive lever and its opposite end articulated to the fifth ball joint carried by the second drive member, and the reaction tie rod is articulated at one end to the second arm of the drive lever and at its opposite end to the structure of the gearbox.

Figure 2:
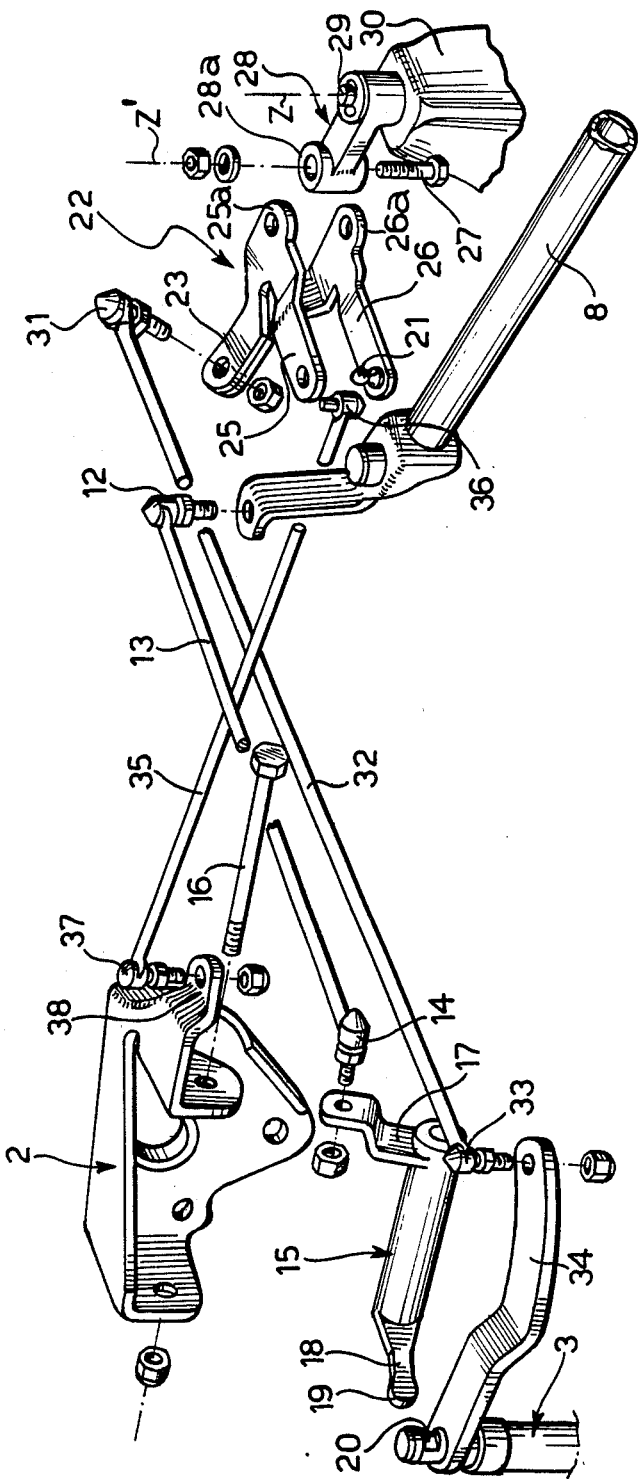
Figure 3:
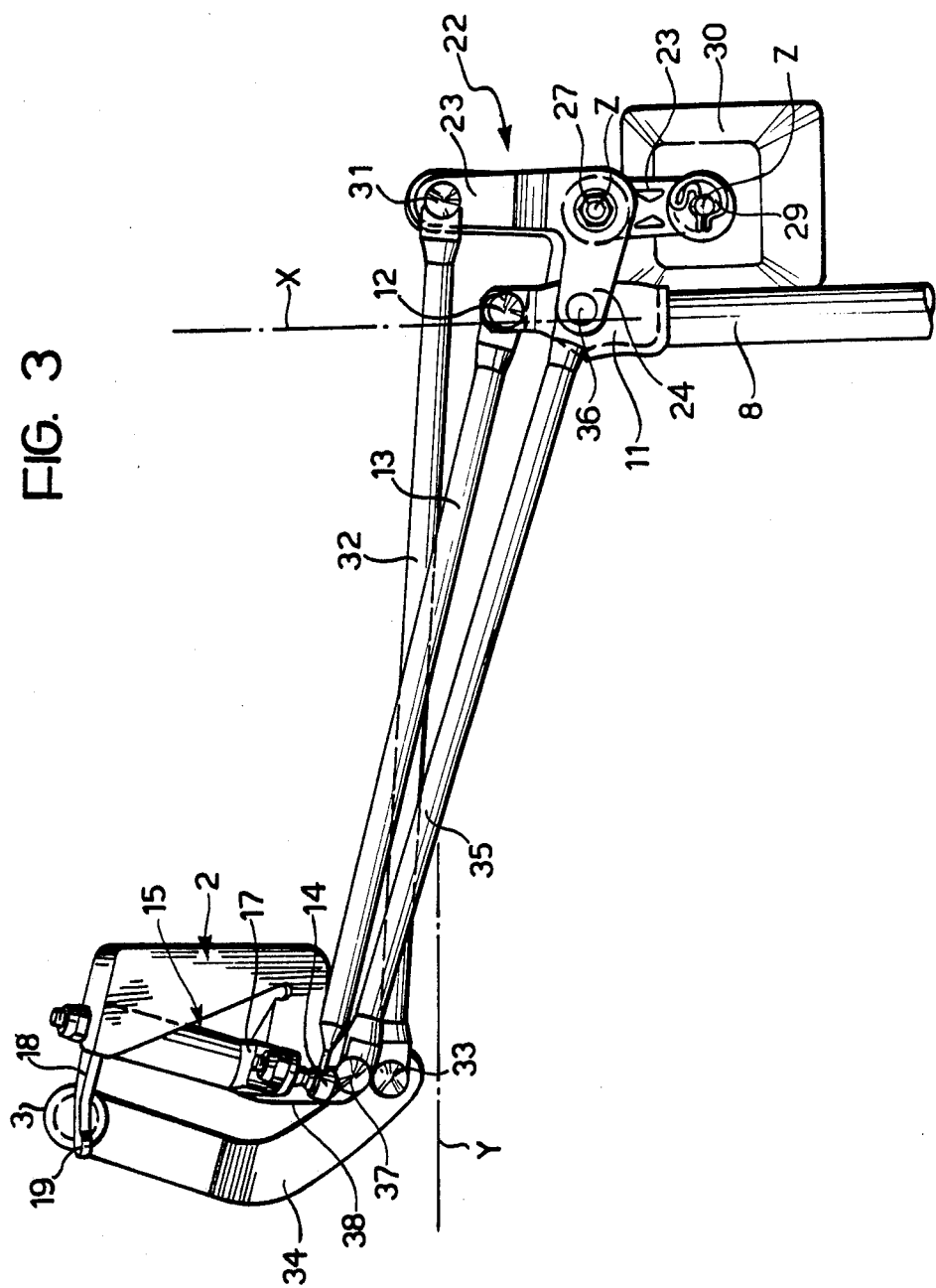

Further characteristics and advantages of the invention will become clear during the detailed description which follows with reference to the appended drawings provided purely by way of non-limiting example, in which:

FIG. 1 is a schematic perspective view of a control device for gearboxes, according to the invention, FIG. 2 is an exploded perspective view of FIG. 1, FIG. 3 is a plan view taken on the arrow III of FIG. 1, on an enlarged scale, FIG. 4 is a plan view taken on the arrow IV, on an enlarged scale, and FIG. 5 is a partially-sectioned side elevational view taken on the arrow V of FIG. 1.

With reference to the drawings, the conventional manually-operated gear lever for motor vehicles is indicated 1. The gearbox, which for brevity is not illustrated in detail in the drawings, comprises a support structure fixed to the engine of the vehicle and including a substantially fork-shaped support 2 and an input actuator member, schematically indicated 3, constituted by a rod which is translatable in opposite directions along a substantially vertical axis and is rotatable in opposite senses about this axis in response to the movements of the gear lever 1.

The gear lever 1 has a control knob 4 at its upper end and is articulated at its lower end about a ball joint, schematically indicated 5, carried by a support 6 fixed to the structure of the vehicle. The gear lever 1 can be moved by means of the knob 4 in a conventional manner with a movement of selection and a movement of engagement of the speed ratios available to the gearbox. These selection and engagement movements are transmitted to the actuator member 3, the translation of which corresponds, for example, to the selection movements and the rotation of which corresponds, for example, to the engagement movements of the lever 1, through a transmission mechanism, generally indicated 7.

The transmission 7 includes a bar 8 which extends substantially along the longitudinal axis of the vehicle, indicated X in the drawings, and the rear end of which is articulated by a joint 9 to a lower appendage 10 of the lever 1, projecting beneath the ball joint 5.

The front end of the bar 8 has a substantially S-shaped end portion 11 carrying at its upper end ball joint 12 to which is articulated one end of a first rod 13. The rod 13 extends substantially along a direction Y transverse the longitudinal axis X of the vehicle and is articulated at its opposite end to a drive member, generally indicated 15, by means of a ball joint 14. The drive member 15 is in effect constituted by a hollow shaft rotatably supported by the support 2 of the gearbox by means of a pin 16 and having a first radial arm 17 and a second radial arm 18 perpendicular to the arm 17 at its respective ends. The free end of the first arm 17 is articulated to the end of the rod 13 carrying the ball joint 14, while the free end of the second radial arm 18, indicated 19, is rounded and rotatably engaged in a lateral recess 20 formed in the top of the actuator member 3. The coupling is such that, when the shaft 15 rotates about its own axis, the actuator member 3 is driven translationally by the radial arm 18 to effect the selection of the speed ratios of the gearbox.

The base of the S-shaped end portion 11 of the bar 8 is articulated by a ball joint 21 to a pivotable drive member, generally indicated 22. This drive member 22 is effectively constituted by a lever with two unequal arms of which the longer one, indicated 23, extends approximately parallel to the longitudinal axis X of the vehicle and the shorter one, indicated 24, extends substantially perpendicular to the longer arm 23, in the direction of the rod 13. In effect, the shorter arm 24 has a forked configuration defined by two superposed branches, an upper one 25 and a lower one 26 respectively, of which the latter carries the ball joint 21 for the bar 8 at its free end.

The cranked lever 22 is pivotably supported by an articulation pin 27 having a vertical axis, indicated Z', which passes through the connected ends 25a, 26a of the two branches 25 and 26 of the shorter arm 24 and the longer arm 23. The pin 27 is carried by a tubular end 28a of a connecting rod 28 which extends generally parallel to the longitudinal axis X of the vehicle and the opposite end of which is articulated about a second substantially vertical pin 29 whose axis, indicated Z, is carried by a support 30 fixed to the structure of the vehicle.

From what has been explained above it will be clear that the drive lever 22 is able to pivot around the vertical axis Z' and to rotate together therewith about the vertical axis Z'.

The free end of the longer arm 23 of the drive lever 22 carries a ball joint 31 to which is articulated one end of the second rod 32 oriented substantially like the first rod 13 and whose opposite end carries a ball joint 33. The ball joint 33 is articulated to the free end of an arm 34 fixed radially to the actuator member 3 close to the recess 20 and by means of which the actuator member 3 is rotated to effect the engagement of the speed ratios of the gearbox.

The transmission 7 also includes a reaction tie rod 35 which extends substantially like the rods 13 and 32 and is jointed at its ends 36 and 37 respectively to the free end of the upper branch 25 of the shorter arm 24 of the drive lever 22 and to an appendage 38 fixed to the support member 2 of the gearbox.

As shown in FIG. 3, the two rods 13 and 32 define, together with the drive lever 22 on the one hand and the drive members 15 and 34 on the other, substantially an articulated parallelogram configuration extending generally in the direction of the axis Y, that is, transverse the longitudinal axis X of the vehicle.

In operation, the selection and engagement movements imparted manually to the gear lever 1 cause corresponding translational and rotational movements of the actuator member 3 to effect the selection and the engagement of the speed ratios available to the gearbox, in the following manner.

When the gear lever 1 is operated for selection, that is, moved to opposite sides of a central neutral position (shown in the drawings) parallel to the transverse direction Y, the bar 8 is pivoted about the ball joint 21 by means of the joint 9. As a result of this pivoting, the S shaped end portion causes, through the ball joint 12, a corresponding translation of the rod 13 along its own axis and hence, through the joint 14, the radial arm 17, the shaft 15, the radial arm 18 and the coupling 19-20, a corresponding translation of the actuator member 3 by means of which the selection imposed by the lever 1 is effected.

When the lever 1 is moved from the imposed selection position parallel to the longitudinal direction X, in one direction or the other from a central position, to engage the desired speed ratio, the bar 8 is moved correspondingly in one direction or the other along the axis X by means of the joint 9. By means of the ball joint 21, the bar 8 causes a corresponding pivoting of the drive lever 22 about the vertical axis Z' and hence, through the ball joint 31, a corresponding translation of the rod 32 along its axis. This rod 32 causes a corresponding angular movement of the actuator member 3 through the ball joint 33 and the radial arm 34 and, as a result of this, the speed ratio imposed by the gear lever 1 is engaged.

During the selection and engagement movements described above, the external forces applied to the gear lever 1 are all contained within the transmission 7, whereby no force is applied to the gearbox by either the selection or the engagement. This is made possible by virtue of the mounting of the drive lever 21 described above and the presence of the reaction tie rod 35 through which the external forces are balanced within the mechanism of the transmission 7.

This enables a positive-type control without resilient play or yielding to be obtained, even in the case of an engine with an associated gearbox which are both resiliently supported by the structure of the vehicle, which is usual. The absence of resilient leads, finally, to perfect precision of selection and engagement of the gearbox, with travels of the gear lever 1 of almost fixed and constant magnitude.

Moreover, the transmission 7 enables the gear lever 1 to be effectively uncoupled from the engine with which the gearbox of the vehicle is associated, avoiding vibrations as well as the transmission of any movement due to the yielding of the resilient supports thereof to the knob 4 of the lever 1. Any movement of the engine along the axes X, X and Z corresponds to a movement of the knob 4 of the gear lever 1 which is reduced practically to zero. With regard to movements along the transverse axis Y, these are due to the fact that the articulated system formed by the rods 13 and 32, the reaction tie rod 35, the pivoted drive lever 22 and the drive members 15 and 34 is oriented along this transverse axis Y, as well as to the fact that the pivot axis Z' of the drive lever 22 is rotatable about the fixed axis Z. The general disposition in an articulated parallelogram and the presence of the various ball joints in the system described previously, however, enables the movements of the engine along the longitudinal axis Y and the vertical axis Z to be absorbed.

This kinematic effect of the transmission system of the invention enables recourse to resilient elements for filtering and absorbing the movements of the engine to be avoided, these being necessary in conventional systems, however, with the consequent harmful effect on the precision of operation of the gear lever of the gearbox in its selection and engagement movements.

Finally, the effect described above gives the further important advantage due to the fact that any imperfections in positioning during assembly of the engine are absorbed within the transmission 7 without having any affect on the position of the gear lever 1, which enables adjustment operations in the assembly line for the vehicle to be avoided.

I claim:

1. A control device for a motor vehicle gearbox comprising a manual gear lever supported by the structure of the vehicle in a position remote from the gearbox and movable with a selection movement and a movement for engaging the speed ratios of the gearbox, an actuator member which is located at the input of the gearbox and is translatable and rotatable in response to the selection and engagement movements of the gear lever, and a transmission interconnecting the gear lever and the actuator member of the gearbox said transmission including a bar articulated to the gear lever and extending substantially along the longitudinal axis of the vehicle, a drive lever pivotable about a first substantially vertical axis which is rotatable about a second substantially vertical axis fixed relative to the structure of the vehicle, first and second rods extending substantially transverse the longitudinal axis of the vehicle and operated by the bar through the drive member to effect the translation and the rotation of the actuator member of the gearbox respectively, and a reaction tie rod connecting the pivotable drive member to the structure of the gearbox substantially in the direction of the two rods.

2. A device according to claim 1, wherein:
the longitudinal bar is articulated at one end to the gear lever at one end and carries a first ball joint at its opposite end,
the drive lever is constituted by a double-armed lever of which the first arm extends generally parallel to the longitudinal axis of the vehicle and carries a second ball joint, and the second arm extends substantially perpendicular to the first arm and carries a third ball joint to which the bar is articulated close to the first ball joint, and by a connecting rod extending generally parallel to the longitudinal axis of the vehicle and having one end articulated to the structure of the vehicle about the fixed vertical axis and its opposite end carrying the rotatable vertical axis about which the drive lever is articulated between the second and third ball joints,
a first drive member is supported rotatably by the gearbox structure to effect the translation of the actuator member and carries a fourth ball joint,
a second drive member is fixed to the actuator member to effect its rotation and carried a fifth ball joint,
the first rod has one end articulated to the first ball joint carried by the longitudinal bar and its opposite end articulated to the fourth ball joint carried by the first drive member,
the second rod has one end articulated to the second ball joint carried by the first arm of the drive lever and its opposite end articulated to the fifth ball joint carried by the second drive member, and
the reaction tie rod is articulated at one end to the second arm of the drive lever and at its opposite end to the structure of the gearbox.

3. A device according to claim 2, wherein the two rods define, together with the drive lever on the one hand and with the drive members on the other, substantially an articulated parallelogram configuration.

4. A device according to claim 2, wherein the second arm of the drive lever has a forked cnfiguration with two superposed branches of which the upper one carries the articulation for the corresponding end of the reaction tie rod, and in that the end of the longitudinal bar opposite the gear lever has a substantially S-shaped end portion which is connected at one end to the lower branch of the second ram of the drive lever through the third ball joint, and at the other carries the first ball joint to which the first rod is articulated.

5. A device according to claim 2, wherein the first drive member is constituted by a shaft carrying at one end a first radial arm which carries the fourth ball joint for the articulation of the first rod, and at its opposite end a second radial arm perpendicular to the first radial arm and operatively associated with the actuator member.

* * * * *